(12) United States Patent
von Klopp et al.

(10) Patent No.: US 7,072,951 B2
(45) Date of Patent: Jul. 4, 2006

(54) HTTP TRANSACTION MONITOR WITH CAPACITY TO REPLAY IN DEBUGGINGS SESSION

(75) Inventors: Ana H. von Klopp, San Francisco, CA (US); George C. Finklang, San Francisco, CA (US); Elizabeth L. Talmage, Geyserville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 724 days.

(21) Appl. No.: 09/970,114

(22) Filed: Oct. 3, 2001

(65) Prior Publication Data

US 2002/0062359 A1 May 23, 2002

Related U.S. Application Data

(60) Provisional application No. 60/237,823, filed on Oct. 3, 2000.

(51) Int. Cl.
G06F 15/16 (2006.01)
(52) U.S. Cl. .................... 709/219; 709/223
(58) Field of Classification Search ........ 717/124–135, 717/15–18, 25, 29, 31; 709/219, 222–223, 709/232, 249
See application file for complete search history.

(56) References Cited

U.S. PATENT DOCUMENTS

| | | | |
|---|---|---|---|
| 5,742,762 A * | 4/1998 | Scholl et al. ............... 709/200 |
| 5,809,250 A | 9/1998 | Kisor | |
| 5,870,607 A | 2/1999 | Netzer | |
| 6,026,404 A * | 2/2000 | Adunuthula et al. .......... 707/10 |
| 6,026,440 A | 2/2000 | Shrader et al | |
| 6,044,398 A | 3/2000 | Marullo et al. | |
| 6,119,247 A * | 9/2000 | House et al. .................. 714/38 |
| 6,145,001 A * | 11/2000 | Scholl et al. ............... 709/223 |
| 6,151,701 A * | 11/2000 | Humphreys et al. ........ 717/130 |
| 6,202,200 B1 * | 3/2001 | House et al. ................ 717/100 |
| 6,330,690 B1 * | 12/2001 | Nouri et al. ................... 714/23 |
| 6,456,308 B1 * | 9/2002 | Agranat et al. ............. 715/854 |
| 6,697,964 B1 * | 2/2004 | Dodrill et al. ................ 714/38 |
| 6,804,814 B1 * | 10/2004 | Ayers et al. ................. 717/135 |
| 6,886,013 B1 * | 4/2005 | Beranek ....................... 707/10 |
| 6,898,791 B1 * | 5/2005 | Chandy et al. ............. 719/314 |

FOREIGN PATENT DOCUMENTS

WO WO 99/01819 1/1999

* cited by examiner

Primary Examiner—Jason Cardone
Assistant Examiner—Jeffrey R. Swearingen
(74) Attorney, Agent, or Firm—Osha Liang LLP

(57) ABSTRACT

A system for monitoring HTTP transactions between a server and a client, including a data collector which runs on the server and collects data from HTTP requests sent by the client to the server and data from HTTP responses sent by the server to the client, a debugging controller which controls an execution mode of the server, a graphical display which displays the collected data and through which replay requests are sent to the server, each replay request specifying a prior HTTP request to be interpreted by the server, a request player which runs on the server and modifies each replay request with a portion of the collected data associated with the prior HTTP request to be interpreted by the server.

25 Claims, 6 Drawing Sheets

HTTP TRANSACTION MONITOR WITH CAPACITY TO REPLAY IN DEBUGGINGS SESSION

CROSS-REFERENCE TO RELATED APPLICATIONS

This application claims priority from provisional application Ser. No. 60/237,823, filed Oct. 3, 2000. This application is related to original U.S. application Ser. No. 09/730,686, filed Dec. 6, 2000.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

TERMINOLOGY

The following glossary of some terms are helpful in understanding the background discussion and the detailed description of the invention.

API (Application Programming Interface)—An interface for application programs and utilities to access the internal services provided by the software that comprises the API.

Applet—A Java™ program embedded in a HTML document and executed in a Java™-enabled browser.

ASP™ (Active Server Pages™)—A scripting environment developed by Microsoft Corporation. ASP™ allows HTML, scripts, and ActiveX components to be combined to dynamically generate web pages.

Bean—A JavaBeans™ component.

Class—A user-defined data type that defines a collection of objects that share the same characteristics. An object is one instance of the class.

Client—A program, often including a user interface, which initiates contact with another program (a server) for the purposes of exchanging data. The server runs in a different process and/or on a different host from the client.

Cookie—A packet of information sent by an HTTP server to a web browser and then sent back by the browser each time the browser accesses the same resource on the server or any other set of resources that is declared by the cookie. Cookies are used to maintain state between HTTP transactions. Cookies are not visible to the browser user.

DHTML (Dynamic HTML)—An extension of HTML. DHTML gives greater control over the layout of page elements and the ability to have web pages which change and interact with the user without having to communicate with the server.

Directory—A simulated file folder on disk.

E-commerce (Electronic commerce)—Typically implies purchasing products via the Web. It also covers electronic data interchange, in which one company's computer queries and transmits purchase orders to another company's computer.

Execution Server—An HTTP server that is used by an IDE for the purposes of assisting with the processes of developing dynamic web components. The IDE uses the execution server to run JSPs and servlets, or dynamic page generation components in general.

CGI (Common Gateway Interface)—A standard for running external programs from a HTTP server.

CGI Script—A small program written in a script language such as Perl that can be invoked through a request to the web server.

GUI (Graphical User Interface)—A graphics-based interface that incorporates, for example, icons, menus, and text entry areas and typically involves non-linear user interaction as opposed to entering input in a set order.

Hook—Programming instructions that provide breakpoints for future expansion. Hooks can be used to call some outside routine or function or may be places where additional processing is added.

HTML (HyperText Markup Language)—A hypertext document format used on the World Wide Web.

HTTP (Hypertext Transfer Protocol)—An application-level protocol for distributed, collaborative, hypermedia information systems.

HTTP Request—A message sent by a client to a server using HTTP. The first line of the request contains the method to be applied to the resource requested, the identifier of the resource, and the protocol version in use. The first line is followed by HTTP headers, lines which provide information about the client, which are optionally followed by a data stream.

HTTP Response—A message sent to a client after the HTTP server receives and interprets a request message from the client. The first line of the response includes the protocol version used by the server and a success or error code. The first line is followed by HTTP headers with information about the server and about the (optional) body content that follows the headers as a data stream.

HTTP Server—A server process which processes HTTP requests.

HTTP Session—Part of the Java Servlet™ APIs. Allows the servlet container to maintain state between different HTTP requests. The servlet container knows which session to associate with the request because the browser sends the session ID as part of the request. This can either be done with a cookie or by rewriting the request URL.

IDE (Integrated Development Environment)—An application that facilitates the process of writing software. An IDE typically includes a syntax-based editor, graphical tools for program entry, and integrated support for compiling, executing, and debugging the program.

IDE Session—The instance of an IDE (and all its internal states) that is created when the user starts up and uses the IDE. The session ends when the user exits the IDE instance.

Internal HTTP Server—Sometimes referred to as internal server. An HTTP server that runs in the same process of an application for the purposes of providing services to it.

JavaBeans™—A component software architecture that runs in the Java™ environment, initially developed by Sun Microsystems, Inc. JavaBeans™ allows developers to create reusable components that can be assembled together using a visual application builder tool.

JSP™ (JavaServer Pages™)—A specification to extend the Java™ Servlet API to generate dynamic web pages on a web server. It includes a set of tags in XML format for creating dynamic content in web pages. In order to use JSP™ on a web server, the web server needs a JSP™ engine and a servlet container. The JSP™ engine is responsible for generating a servlet from the JSP™ page and maintaining a name convention such that the servlet is invoked when the JSP™ page is processed. JSP™ was developed by Sun Microsystems, Inc.

JSP™ Page—A text-based document that uses fixed template data and JSP™ elements and describes how to process a request to create a response. The template data consists of JSP™ tags embedded in static content which is typically HTML.

LRI (Local Resource Identifier)—The location of a resource relative to the hierarchical structure of the server, e.g., a path relative to the server's document root if the resource is a file.

Plug-in—An auxiliary program that works with a major software package to enhance its capability.

Process—An executing program with its own internal data states that are not accessible to other processes.

Web Resource—A network data object or service that can be identified by a URI.

Server—An application program that accepts connections in order to service requests by sending back responses.

Servlet—A Java™ program that runs exclusively in a servlet container which is an extension to a web server.

Servlet Container—"A servlet container contains and manages servlets over their lifecycle. It operates in conjunction with a web server or application server to provide the network services over which requests and responses are sent, allowing the servlets to process requests and create responses.

URL (Uniform Resource Locator)—A compact string representative of resources available via the network. A URL has the form <protocol>://<server name><LRI><?optional parameters>.

Virtual Machine—A virtual machine for Java™ is a Java™ interpreter that reads and executes Java byte code.

Web Browser—A client application that requests resources from a web server, usually for the purpose of displaying them. Examples of browsers are Microsoft® Internet Explorer and Netscape Navigator.

XML (eXtensible Markup Language)—A mark-up language that provides a format for describing structured data.

BACKGROUND OF INVENTION

A web application is a web site where users can access the information they need and change the state of application logic on a server through a set of web pages. Development of web applications is usually centered around tools and technologies. A web application centered around the Java™ technology may include the following: JSP™ pages and Java™ servlets that handle HTTP requests and generate dynamic content, server-side beans that encapsulate application behavior and state, static HTML files, DHTML files, image files, sound files, and libraries with additional Java™ components, such as client-side Java™ applets and any Java™ class files used by the other Java™ components. The J2EE™ specification describes a standard for how to organize such files into web modules, including describing how they are accessed. The web modules could be developed in an IDE, such as sold under the trade name Forte™ for Java™ by Sun Microsystems, Inc.

Now, suppose the user has identified a problem with how the input from one of the form fields in page A is processed by JSP_B, and say further that JSP_B is sufficiently complex that the cause of the problem cannot be immediately identified through inspecting the source. This means that the developer will need to employ some other tactic to identify the problem with the code. One such strategy is using a source level debugger. However, reproducing the request in a debugging section is a non-trivial task. First the user has to restart the HTTP server in debugging mode, a process that typically involves several steps. Then they have to start a debugging client and connect it to the server. Then they have to resubmit the request from Page A to the server that is now running in debugging mode. Clearly it would be desirable if the user can resubmit the request resulting from Page A without having to make a request for JSP_A and reenter the data into the resulting Page A's input fields. However, this may not be possible for several reasons. First, consider a portion of a web application that deals with entering billing and shipping addresses for the purpose of allowing the user to purchase goods or services. Assume that the web application includes page generation components JSP_A and JSP_B, respectively. Components JSP_A and JSP_B could be JSP™ pages, for example. JSP_A generates a page A that displays an HTML form in a browser where the user can enter billing and shipping addresses and press a "Continue" button to submit the information. Pressing the "Continue" button causes the browser to make a HTTP request to JSP_B with the data from the form fields as request parameters. If the address information is valid, JSP_B generates a page B which displays the addresses as text and asks the user to confirm that the addresses are correct. If the address information is invalid (e.g., because of a missing phone number or a zip code which contains characters other than digits), JSP_B forwards the request back to JSP_A, which regenerates page A with some extra messages that point to invalid entries.

Now, suppose that the user has identified a problem with how the input from one of the form fields in page A is processed by JSP_B. The user will attempt to fix the bug and then re-execute JSP_B with the same input from page A. In this situation, it is clearly desirable for the user to be able to resubmit the request from page A without having to reenter the same data into the page's input fields. However, this may not be possible for several reasons. First, it is common for dynamically generated pages to include a HTTP directive which specifies that the page should not be cached (by the browser or by a proxy server). This means that the browser's "Back" or "Reload" button would not populate the page's input fields with the previously entered data. Using the "Back" button would cause the form from which the HTTP request was created to be regenerated, losing any data that was previously entered. With reference to the example above, this means that if the user used the "Back" button to display page A, all the data the user previously entered on page A would be lost, so the user cannot just select the "Continue" button to resubmit the same request. The user can work around this by disabling the directive, but that involves extra work and remembering to enable it again later. Also, unless the developer can use the back button to redisplay Page_A with their original input, there is no simple way of making minor changes for the purposes of running the debugger with slightly different input Once the developer has identified the problem and fixed it, they will want to return the execution server to its normal running mode to test the fix comprehensively. To do so, they will have to restart the server in normal running mode, and then send the same (and similar) requests for JSP_B again, which typically means repeating the process of invoking JSP_A and entering different input all over again.

SUMMARY OF INVENTION

In general, in one aspect, the invention comprises a system for monitoring HTTP transactions between a server and a client. The system comprises a data collector which runs on the server and collects data from HTTP requests sent by the client to the server and data from HTTP responses sent by the server to the client. A debugging controller controls an execution mode of the server. A graphical display that displays the collected data through which replay requests are sent to the server. Each replay request specifies a prior HTTP request to be interpreted by the server. A request player runs on the server and modifies each replay request with a portion of the collected data associated with the prior HTTP request to be interpreted by the server.

In general, in one aspect, the invention comprises a system for testing and debugging a web application. The system comprises a server which hosts the web application, a client which accesses components of the web application by sending HTTP requests to the server and receiving HTTP responses from the server. A data collector runs on the server and collects data from the HTTP requests and the HTTP responses. A debugging controller runs on the client and controls an execution mode of the server. A graphical display that displays the collected data and through which replay requests are sent to the server, each replay request specifying a prior HTTP request to be interpreted by the server. A request player runs on the server and modifies each replay request with a portion of the collected data associated with the prior HTTP request to be interpreted by the server.

In general, in one aspect, the invention comprises a method for testing and debugging a web application. The method comprises sending a requested execution mode to the debugging controller, determining an execution mode of a server, comparing the requested execution mode and the execution mode of the server, switching the execution mode of the server to match the requested execution mode, forwarding the HTTP request to the execution server, and running and modifying each reply request with a portion of the collected data associated with the portion of a prior HTTP request.

In general, in one aspect, the invention comprises a tool for testing and debugging a web application. The tool comprises means for sending a requested execution mode to the debugging controller, means for determining an execution mode of a server, means for comparing the requested execution mode and the execution mode of the server, means for switching the execution mode of the server to match the requested execution mode, means for forwarding the HTTP request to the execution server, and means for running and modifying each reply request with a portion of the collected data associated with the portion of a prior HTTP request.

Other aspects and advantages of the invention will be apparent from the following description and the appended claims.

DETAILED DESCRIPTION

Embodiments of the present invention provide a tool that records data relevant to the processing of HTTP requests. Further, the present invention allows the user to examine the recorded data to aid in debugging web applications. Further, the present invention allows the HTTP requests that have been previously sent to the server, to be replayed on the server. Further, the present invention allows the user to optionally configure the server to operate in a debugging mode and transparently start the debugging client. Once in debugging mode, the present invention allows the user to replay HTTP requests, edit and then replay HTTP requests, and replay a sequence of HTTP requests. Once a particular resource has been identified as containing the source of an error, e.g. there is an error within a particular servlet or JSP, the present invention allows the developer to easily reproduce the request that exposes the problem within a source level debugging session, thus simplifying the process of tracking down the problem.

The present invention allows the user to transparently replay a HTTP request while simultaneously switching the server to debugging mode and opening the debugging client. Once this occurs the error can be readily identified through source level debugging using the debugging client. Once the error has been identified and fixed, the present invention allows the user to transparently switch back to normal execution mode. In normal execution mode, the present invention allows the user to replay the HTTP request to verify that the error was fixed.

In the description of the present invention which follows, a web application which contains JSPs™ and servlets is used in illustrating the principles of the invention. However, it will be understood by one of ordinary skill in the art that the principles of the invention are applicable to web applications containing other types of dynamic page generation components such as ASPs™ and CGI scripts. Also, for convenience, the following description is outlined into five principal sections, including Architecture overview, Directory Structure, HTTP Transaction Monitor GUI, HTTP Transaction Monitor Client-Side and Server-Side Functionality, and Operation.

Architecture Overview

Figure 1:
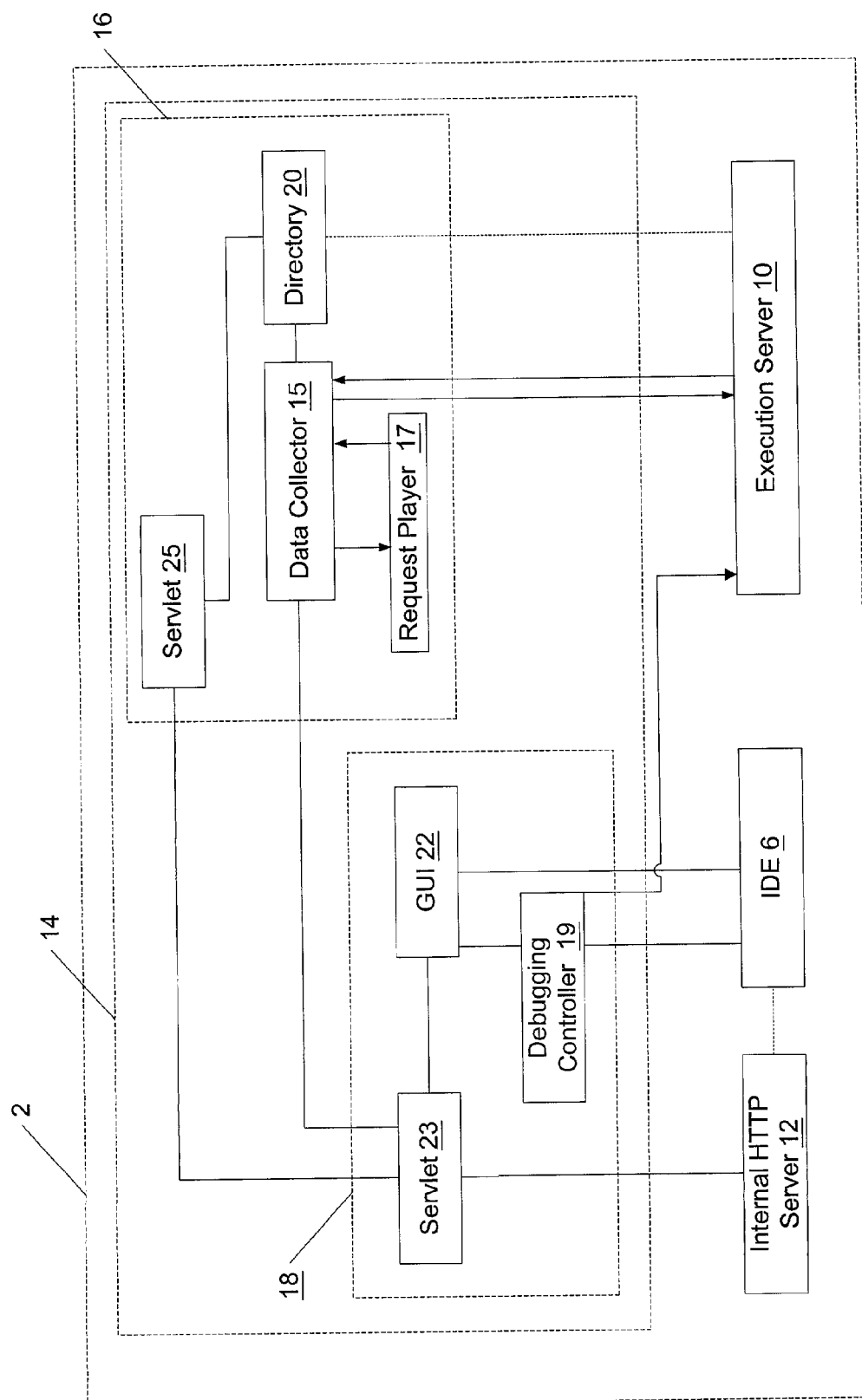
FIG. 1 is a block diagram of a testing/debugging system incorporating a HTTP transaction monitor according to one embodiment of the invention.

FIG. 1 shows a block diagram of a testing/debugging system 2, which includes an embodiment of the invention. The testing/debugging system 2 includes an IDE 6 which can be used to design, compile, execute, test, and debug components of a web application. In one embodiment, the IDE 6 is a Java™ application which contains bytecodes that are interpreted by a Java™ Virtual Machine (not shown). However, the IDE 6 may be written in other programming languages, e.g., C++. When the IDE 6 is started, a GUI (not shown) is displayed through which a developer can develop and/or view the components of the web application. Further, the IDE 6 can execute the web application components on a HTTP server that is running in a separate process. This HTTP server will be referred to as the execution server 10. The execution server 10 may be started from an IDE by, for example, selecting an icon corresponding to a web module (not shown) in order to bring up a menu and subsequently selecting an "execute" option. The execution server 10 may be on the same host machine as the IDE 6 or may be on a different host machine.

In accordance with one embodiment of the invention, a HTTP transaction monitor 14 includes a server-side component 16, which collects data about HTTP transactions on the execution server 10, and a client-side component 18, which displays the collected data. The HTTP transactions can either be initiated by the IDE 6 or through an external HTTP client, e.g., a browser, pointed to the host and port of the execution server 10. The server-side component 16 includes a data collector 15 that is responsible for collecting data before and after the execution server 10 processes the HTTP requests. In one implementation, the IDE 6 includes a mechanism through which the data collector 15 can notify the HTTP transaction monitor 14 of requests processed by the execution server 10. This mechanism can be a HTTP server 12 that is built into the IDE 6 and configurable from the IDE 6. If the HTTP transaction monitor 14 is run as a standalone application, then the HTTP transaction monitor 14 is responsible for maintaining the mechanism through which it is notified when the execution server 10 processes a new HTTP request.

In one implementation, the data collector 15 runs on the execution server 10 and relies on hooks in the execution server 10 to intercept HTTP requests in order to collect data about them. In one embodiment, the data collector 15 uses hooks in a server plug-in (e.g., a servlet container) that is responsible for handling requests to components of the web application which generates responses dynamically to intercept HTTP requests in order to collect data about them. The server-side component 16 also includes a notification mechanism which notifies the client-side component 18 when a HTTP request has been processed so that the client-side component 18 can update its transaction list. In one implementation, the data collected by the data collector 15 is stored as one or more files in a directory 20 on the execution server 10 and managed by the server-side component 16. In this implementation, the notification mechanism sends the client-side component 18 sufficient data to display the transaction corresponding to the HTTP request. In another implementation, the data files are sent to and managed by the client-side component 18.

The server-side component 16 also includes a request player 17 that detects a special type of HTTP request ("replay request") sent by the client-side component 18. The replay request indicates that a prior HTTP request should be replayed and contains sufficient information to recreate the prior HTTP request. The request player 17 modifies the replay request to be identical to the original request before passing the replay request. The modified request is then processed by the data collector 15 before control is yielded to the execution server 10. The request player 17 runs on the execution server 10. In one implementation, the request player 17 relies on hooks in the execution server 10 or hooks in a server plug-in (e.g., a servlet container) to intercept replay requests coming into the execution server 10. Alternately, the request player could be invoked by the data collector 15 before the data collector 15 collects any data. The request player 17 replaces all the request data, i.e., the IP address of the client from which the HTTP request originated, the HTTP method, the request URL, the protocol version, any query string and/or parameters or other data from the request body, and all the HTTP headers, in the replay request with the corresponding data from the HTTP request that is to be replayed. The data needed to modify the replay request may be loaded directly from the directory 20 or may be passed in as parameters with the replay request (i.e., if the data is managed by the client-side component 18). In another implementation, the request player 17 is invoked by the data collector 15. The data collector 15, prior to processing an HTTP request determines if the HTTP request is a replay request. If the HTTP request is a replay request, the data collector 15 sends a request to the request player 17 to modify the HTTP request, e.g., re-populate the data fields. Once this has been completed, the data collector 15 proceeds with processing the HTTP request.

In one implementation, the client-side component 18 is accessible from the IDE 6. The client-side component 18 includes a GUI 22 which displays the transactions for which the server-side component 16 has collected data. The GUI 22 also allows the user to send a request to the execution server 10 to replay a prior HTTP transaction. The client-side component 18 further includes a mechanism for receiving notification of new HTTP transactions, which are subsequently listed on the GUI 22. In one embodiment, this functionality is handled by a servlet 23 which runs on the internal HTTP server 12 and is called whenever the server-side component 16 records a new transaction.

The client-side component 18 also includes a debugging controller 19 that controls the execution mode of the server i.e., normal or debugging, and the mechanism for allowing transparent switching between the two modes. The normal mode corresponds to regular execution of the execution server 10. The debugging mode corresponds to executing the HTTP requests with a debugging session on the execution server 10. When the client-side component issues a reply request, it first contacts the debugging controller 19 to check whether the execution server 10 which the request is intended to run on is in the desired mode. If not, the client-side component 18 issues a request to the debugging controller 19 to switching the mode of the execution server 10. Once the client-side component 18 receives confirmation from the debugging controller 19 that the server is running in the desired mode, it issues the request.

Directory Structure

In one implementation, the directory 20 is treated as part of the server-side component 16 and is installed as a web module on the execution server 10. In alternative embodiments, the directory 20 may be maintained by the client-side component 18. The contents of the directory 20 include the following: a subdirectory "current" and a subdirectory "save." The subdirectory "current" contains files with the data from each transaction that has been recorded in the current IDE session and which has not been saved. The subdirectory "save" contains files with the data for each transaction that has been saved. It should be noted there could be other ways of keeping track of whether the transactions are current or saved. The current transactions may be deleted when the IDE session is terminated in order to save disk space.

For each HTTP transaction that the execution server 10 processes, the categories of data shown in Table 1 below are collected. The data can either be stored in a single structure file (e.g., an XML file), which is processed by the client-side component 18, or can be stored as several files in a directory that is specific to the transaction.

TABLE 1

Categories of Data Collected by Server-Side Component

| Category | List of Data Collected |
|---|---|
| Request | The IP address of the host from which the request was sent, the HTTP method, the LRI, path information (if appropriate), the query string, the protocol version, the |

TABLE 1-continued

Categories of Data Collected by Server-Side Component

| Category | List of Data Collected |
|---|---|
| | referrer (if appropriate), the value of any incoming parameters, the request attributes before and after the request was processed, the page attributes before and after the request was processed, and the exit status of the HTTP response. |
| Cookies | List of incoming and outgoing cookies. For incoming cookies, the name and value is provided. For outgoing cookies, the name, value, domain, time to live, path and whether the cookie requires secure protocol. |
| Session | Whether the session exists before and after the transaction. Which attributes were set and what their values are before and after the transaction. The session's properties: its ID, when it was created, its maximum inactive interval, and when it was last accessed. |
| Servlet and Servlet Context Properties | Name of the servlet as configured, its class name, its package name, the description given by the developer, and the relative path to the servlet. The servlet's initialization parameters, if there are any. The absolute path to the J2EE ™ context. The servlet container's properties (Java Development Kit and platform). The servlet context properties including context attributes. |
| Client | The version of the HTTP protocol, the client's IP address, any other information provided through the HTTP headers such as the nature of the client, e.g., the type and version of the browser, the user's language preference, and what formats and character sets the browser can deal with. |

In addition to collecting data for the purpose of displaying information about the transaction, the data collector 15 generates the information required to list the transaction in the GUI 22. This information can either be included in a single structured data file (e.g., an XML file), or the information can be stored in a separate file in a directory corresponding to the transaction. In one embodiment, this information includes the ID of the transaction, the HTTP method, the LRI of the request, and timestamp of the transaction. Additional data may be included to generate more detailed list entries.

In one implementation, the directory 20 is maintained as part of a web module. In this implementation, the web module includes a set of servlets which manage the directory 20. The servlets are invoked by the client-side component 18 when the user wishes to display data about a request or save or delete a request. Such a web module could run either on the execution server 10 as part of the server-side component 16 or on the internal HTTP server 12. In FIG. 1, the web module is part of the server-side component 16, where the servlets in the web module are indicated collectively at 25. The servlets 25 perform the following functions: serve up data from the files stored in the "current" and "save" subdirectories, delete records corresponding to one or more transactions, move records up from the "current" subdirectory to the "save" subdirectory, and serve up a list of all current and saved transactions.

In another implementation, the directory 20 is maintained directly by the client-side component 18, in which case there is no need for servlets 25 to manage the data. In this implementation, the client-side component 18 can use normal file operations to access the data.

HTTP Transaction Monitor GUI

Figure 2:
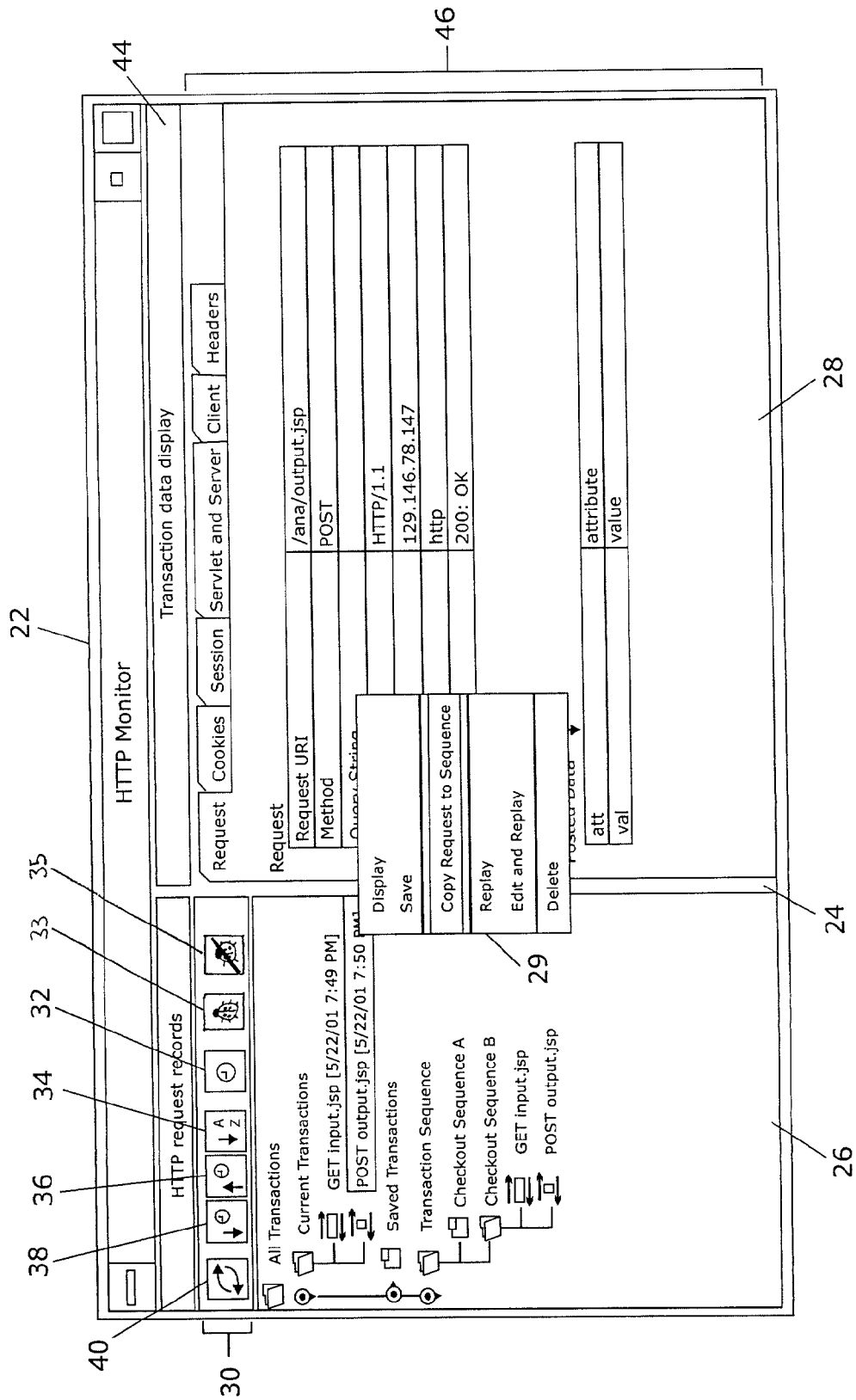
FIG. 2 shows a GUI for the HTTP transaction monitor in accordance with one embodiment of the invention.

The GUI 22 may be a software component that can be called from within the IDE 6 or may be a standalone application. FIG. 2 illustrates a possible representation of the GUI 22. In the figure, the GUI 22 includes a single frame 24 having a left pane 26 and a right pane 28. The GUI 22 displays a list of transactions on the left pane 26 and data for an individual transaction on the right pane 28. A row of buttons 30 above the transaction list on the left pane 26 allows the user to reload all transactions, to modify display parameters, and set the execution mode, e.g., normal or debugging. A button 32 reloads all the transactions. A button 34 displays the transactions in alphabetical order, by LRI. A button 36 displays the transactions in temporal order, last transaction last. A button 38 displays the transactions in reverse temporal order, last transaction first. A button 40 toggles whether the time stamp of the transaction is shown or not. Buttons 33 and 35 form a toggle-able pair i.e., one button is required to be selected at all times, and if one button is toggled the other button is not toggled. The buttons 33 and 35 determine whether a selected transaction is executed in the normal mode or the debugging mode. If button 33 is toggled then the HTTP request is executed in debugging mode. If button 35 is toggled then the HTTP request is executed in normal mode. The default is the normal mode, with button 35 toggled.

The left pane 26 displays one super category node "All Transactions." Under the "All Transactions" node are sub-category nodes "Current Transactions," "Saved Transactions," and "Transaction Sequence." Individual transactions are leaf nodes and reside in either the "Current Transactions" or the "Saved Transactions" node. Entries in the "Current Transactions" node are available during a current IDE session, while entries under the "Saved Transactions" node persist until they are deleted by the user. The entries under the "Current Transactions" and "Saved Transactions" nodes are obtained from the "current" and "save" subdirectories in the directory 20 (shown in FIG. 1). The "Transaction Sequence" node contains folders that are created and named by the user to hold sets of HTTP requests to be replayed together as a sequence. The user adds leaf nodes which correspond to individual HTTP request under these sequence folders. Like the "Saved Transactions" entries, the "Transaction Sequence" entries persist until they are deleted by the user.

Individual transaction nodes in the "Current Transactions" subcategory have six actions: "Display," "Save," "Copy Request to Sequence," "Replay," "Edit and Replay," and "Delete." In the "Saved Transactions" subcategory, the individual transaction nodes have five actions: "Display," "Copy Request to Sequence," "Replay," "Edit and Replay," and "Delete." The sequence folders under the "Transaction sequence" node are represented by icons which have a badge that indicates whether new transactions have their HTTP requests recorded into the sequence or not. The sequence nodes have the following actions: "Toggle request recording," "Reorder," "Rename," "Replay sequence (step)," "Replay sequence (to end)," and "Delete." In one implementation, the list of actions available under each transaction category is displayed in a pop-up menu 29 when the user right-clicks on a transaction.

The "Copy Request to Sequence" action brings up a dialog (not shown) where the user can select or create a sequence folder (under the "Transaction Sequence" node) into which a HTTP request may be copied.

The "Replay" action invokes the debugging controller 19 to detect if the execution server 10 upon which the HTTP request was originally executed on is running. If the execution server 10 is not running, the execution server 10 is started. The execution server 10 is started in the normal mode if button 35 is toggled. The execution server 10 is started in the debugging mode if the button 33 is toggled. If the execution server 10 is running in normal mode and button 33 is toggled, the execution server 10 is switching to debugging mode. If the execution server 10 is running in debugging mode and button 35 is toggled, the execution server 10 is switched to normal mode. The HTTP request is then sent to the execution server 10.

The "Edit and Replay" action brings up a dialog, which allows the user to modify the HTTP request data prior to causing it to be re-processed by the execution server 10. Additionally, the user can modify which execution server 10 the user wants to execute on through the dialog. When the user completes the editing of the HTTP request and sends the HTTP request to the execution server 10, the debugging controller 19 intercepts and examines the HTTP request. If the execution server 10 upon which the HTTP request is to be run is not running, the execution server 10 is started. The execution server 10 is started in the normal mode if button 35 is toggled. The execution server 10 is started in the debugging mode if the button 33 is toggled. If the execution server 10 is running in normal mode and button 33 is toggled, the execution server 10 is restarted in debugging mode. If the execution server 10 is running in debugging mode and button 35 is toggled, the execution server 10 is restarted in normal mode. The modified HTTP request is then sent to the execution server 10.

The "Reorder" action brings up a dialog (not shown) which shows a list of the HTTP request nodes inside the sequence and allows the user to move individual nodes up or down.

"Replay sequence" causes the HTTP requests described by each sequence folder to be replayed one at a time in sequence. With "Replay sequence (step)," the output from each request is shown before moving on to the next request. With "Replay sequence (to end)," only the output of the last request is shown. To execute the sequence, a thread is started which attempts to execute each request in order, waiting for one to succeed before executing the next one. Each individual request has have a timeout, which can be some default number or can be set by the user. If any individual request fails, the output of that request is displayed to the user, and the user is notified of the problem. Otherwise, the output of the last request in the sequence is displayed. For each replay request within the sequence the debugging controller 19 intercepts and examines the HTTP request. If the execution server 10, upon which the HTTP request is to be run is not running, the execution server 10 is started. The execution server 10 is started in the normal mode if button 35 is toggled. The execution server 10 is started in the debugging mode if the button 33 is toggled. If the execution server 10 is running in normal mode and button 33 is toggled, the execution server 10 is switched to debugging mode. If the execution server 10 is running in debugging mode and button 35 is toggled, the execution server 10 is switched to normal mode. The HTTP request is then sent to the execution server 10.

The right pane includes a display component 44 having six tabs, collectively indicated at 46. For a transaction selected on the left pane 26, the six tabs 46 display the data collected by the server component (16 in FIG. 1) according to the categories shown in Table 1 above. The six tabs 46 have the labels "Request," "Cookies," "Session," "Servlet and Server," "Client," and "Headers," respectively. The "Request" tab displays the request and response parameters for a selected transaction. The HTTP headers associated with the request are displayed separately in the "Headers" tab. The "Cookies" tab displays attributes of incoming and outgoing cookies for a selected transaction. The "Session" tab displays the session status before and after executing the selected transaction. The "Servlet and Server" tab displays the servlet and server properties when the selected transaction was executed. The "Client" tab displays properties of the client making the request for the selected transaction.

Figure 3:
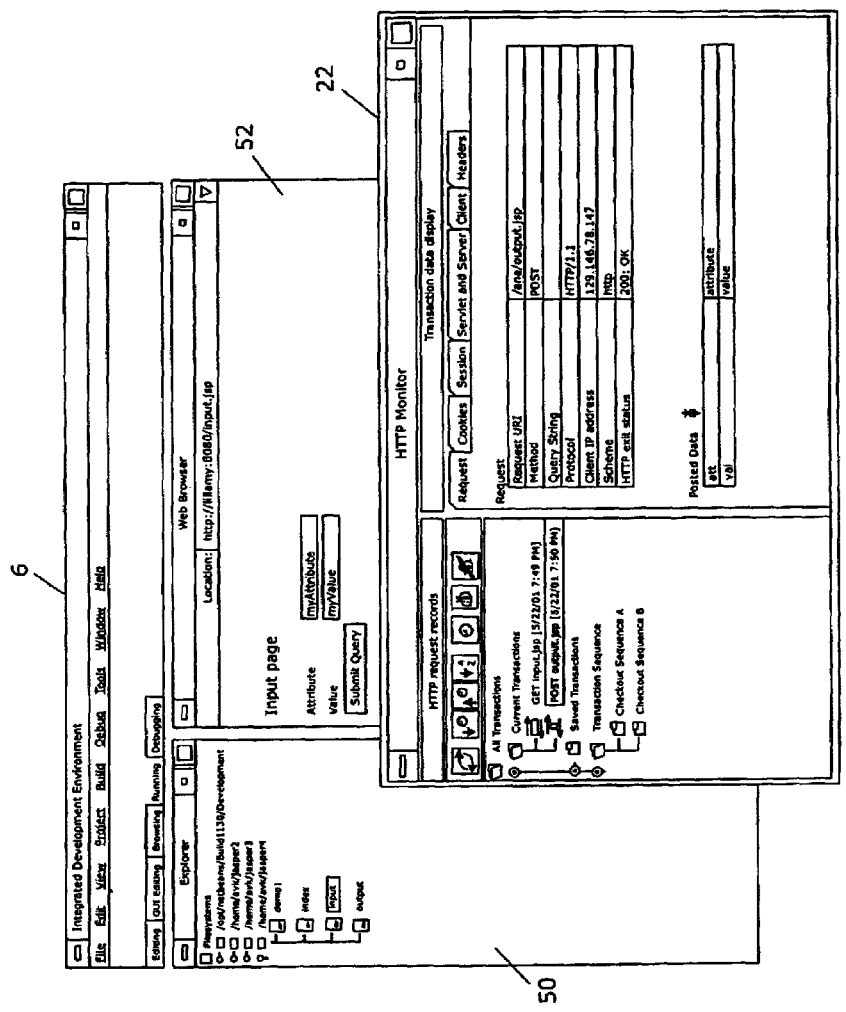
FIG. 3 shows the GUI of FIG. 2 integrated with an IDE.

FIG. 3 shows the GUI 22 invoked from within the IDE 6. In the drawing, the IDE 6 is illustrated as the Forte™ for Java™ IDE from Sun Microsystems, Inc. The Internet Edition of the Forte™ for Java™ IDE includes two modules which assist in designing, debugging, executing, and debugging JSP™ pages and servlets. However, it should be clear that the invention is not limited to this particular IDE, or for that matter to any IDE. The HTTP transaction monitor of the present invention can be used as a standalone tool with a web server. The invention is also not limited to IDEs that support development of JSP™ pages and servlets. In general, the invention can be applied to any development of web applications.

In the illustrated embodiment, the user can invoke the GUI 22 by selecting the appropriate option in the "Debugging" menu or "View" menu (see FIG. 3) of the IDE 6. This displays the GUI 22 during the IDE session or until it is closed by the user. The IDE session is the period during which the user runs one instance of the IDE 6. The IDE session starts when the user brings up the IDE 6 and ends when the user exits the IDE 6.

HTTP Transaction Monitor Client and Server-Side Functionality

Figure 4:
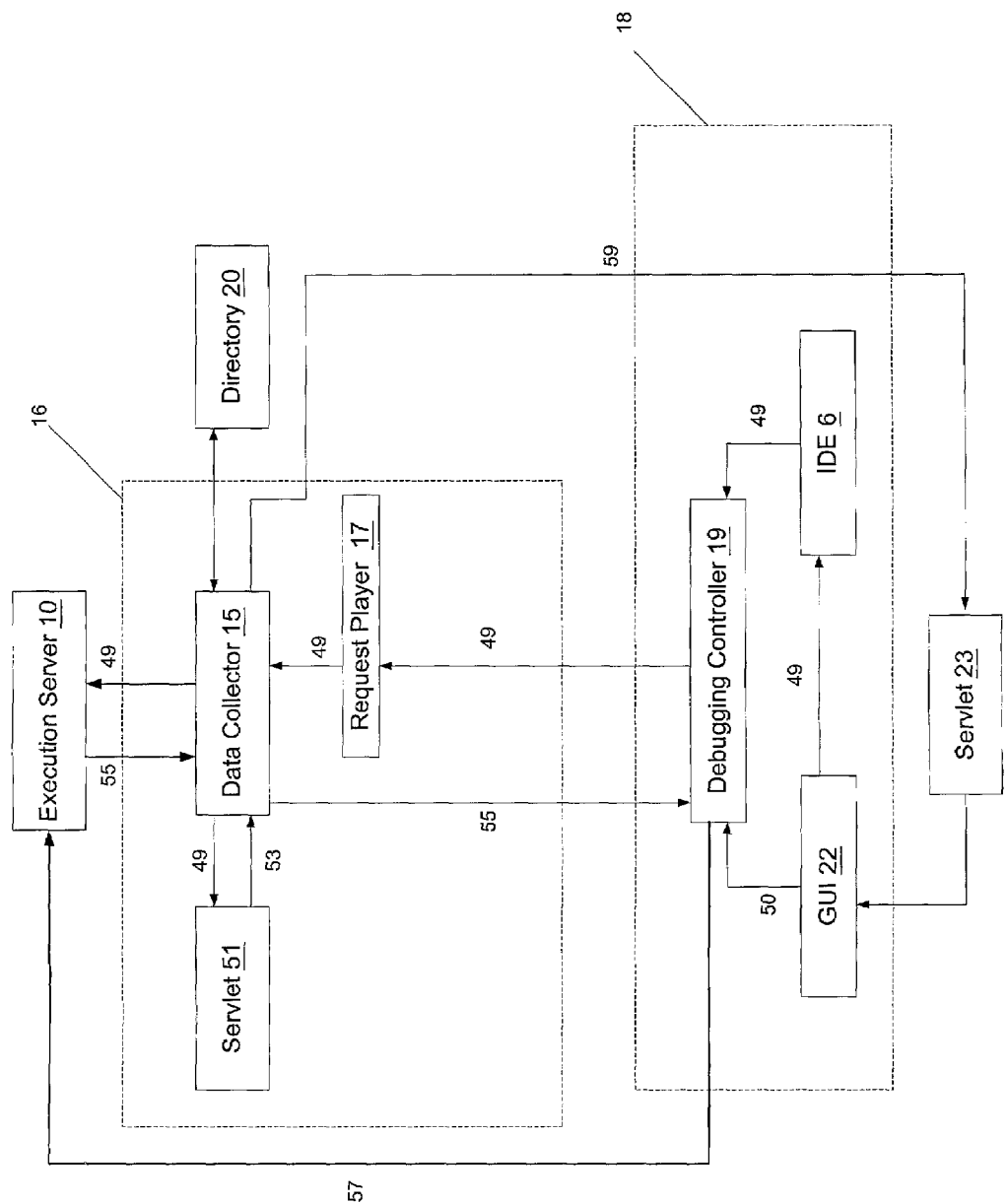
FIG. 4 is an illustration of how the client-side and the server-side components shown in FIG. 1 operate in accordance with one embodiment of the present invention.

FIG. 4 illustrates how the client-side 18 and the server-side components 16 operate in accordance with one embodiments of the present invention. Suppose that a request 49 is selected for replay in the GUI 22. The "replay" action causes the following to happen. First, the debugging controller 19 is invoked to determine whether the HTTP server to which the request is supposed to be sent is running in the desired mode (normal execution or execution in a debugging session). The client-side component 16 determines which execution mode is to be used through checking the state of the toggle buttons 33 and 35.

The debugging controller 19, based on the aforementioned information, may send a command 57 to execution server 10, to start the execution server 10 in the mode specified in the GUI 22. Based on the command 57, the execution server 6 may be exited and may be restarted. In one implementation, debugging, for portions of the execution server 10, may be activated without shutting down the entire execution server 10. Once the mode is selected, the debugging controller 19 sends a confirmation to the client-side component 16. The client-side 16 subsequently sends the request to the execution server 10 via an internal HTTP server 12.

Before the execution server 10 processes the incoming request 49, the request player 17 intercepts the incoming request 49 and checks whether the incoming request 49 is a replay request. In one embodiment, this involves looking for a specific query string, e.g., "ffj_resend," in the URI of the incoming request. The query string appended to the URI may have the general form "ffj_resend=<id>&ffj_status={current,save,replay}." If the query string contains parameters of these names, then the request player determines that this is a replay request and retrieves the data corresponding to the original request. If the data is managed by the server-side component 16, it is retrieved from disk. In the implementation described in FIG.

2, the data is managed by the client-side component 16. In this case, the request player retrieves the data from the client side component by making a HTTP request to Servlet 23, which in turn retrieves the data from the client-side component 16. When the original request data has been retrieved, the request player changes the incoming request 49 so that it is identical with the original request (or edited version of the original request). It then yields control to the data collector 15. If an incoming request 49 does not contain the parameters above in the query string, the request is not a replay request and the request player immediately yields control to the data collector 15.

The data collector 15 intercepts the incoming request 49 and collects data about the request. The collected data includes information about the client making the request, the session state before the transaction, incoming cookies, servlet properties data, and all the request data except the exit status (see Table 1 above). The data collector 15 then yields control to the execution server 10. The execution server 10 invokes a servlet 51 to process the request. The servlet 51 generates a response 53. After the servlet 51 has generated the response 53, control is transferred back to the data collector 15. The data collector 15 collects, at least, the following information: the session state after the transaction, request and page context attributes after the transaction, outgoing cookies, and exit status of the response. The data collector 15 then notifies the client-side component (18 in FIG. 1) by sending a HTTP request 59 to the servlet 23, indicating that a new transaction has been processed. The servlet 23 subsequently updates the GUI 22. If the recorded data is managed by the server-side component (16 in FIG. 1), then the data is written to the directory 20. If the recorded data is managed by the client-side component (18 in FIG. 1), then the data is sent with the HTTP request 55 to the client-side component (18 in FIG. 1). The data collector 15 then yields control to the request player 17, which simply allows the response 53 to leave the execution server 10.

In one implementation, the debugging controller 19 uses a "Server Integration" API for controlling the server execution functionality. In this implementation, each execution server provides an implementation of the API called a server integration plugin. The server integration plugin uses proprietary methods for starting, stopping, and turning debugging on/off on the execution server. When the debugging controller receives a request to turn on debugging, the server integration plugin turns on debugging on the execution server using proprietary methods.

Operation

For the developer, the process of developing a web application involves, among other tasks, testing each dynamic web component (in the case of a Java™ application, each JSP™ and servlet) to see that the component performs the correct processing and generates the appropriate output. This involves executing individual web components and also sequences of components as they would be traversed by a user who browses the web site. In the discussion that follows, the web application to be tested has been developed in an IDE, for example, the IDE 6 (shown in FIG. 3). The developer is using the IDE to test-run and debug the web application. The developer can execute the JSP™ pages or servlets from the IDE. The HTTP transaction monitor GUI (22 in FIG. 3) is displayed by the previously described mechanism. As shown in FIG. 3, the contents of a web application are displayed in a GUI 50 that is included in the IDE 6. The developer selects a resource in the web application and then asks the IDE 6 to execute the resource. For example, in FIG. 3, a JSP™ page called "input" has been selected. To display the page, the IDE 6 sends an HTTP request to the execution server (10 in FIG. 1). The request is executed on the execution server 10. The output of the execution server (10 in FIG. 1), i.e., the HTTP response, is displayed in the browser 52, which is included in the IDE 6.

Figure 5:
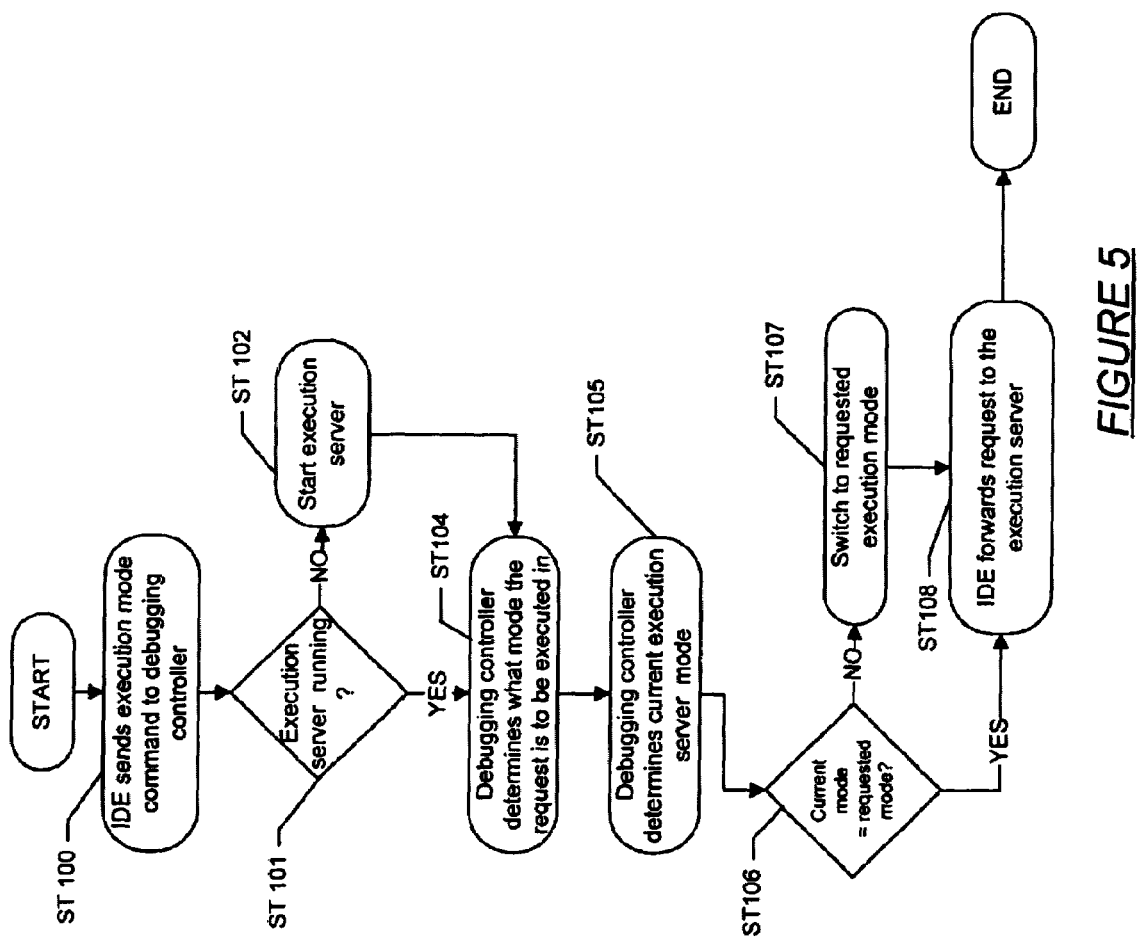
FIG. 5 illustrates, in flowchart form, the typical operation of the client-side component of one or more embodiments of the present invention.

FIG. 5 illustrates, in flowchart form, the typical operation of the client-side in one or more embodiments of the present invention. Prior to sending an HTTP request to the execution server 10, an IDE 6 sends an execution mode command to the debugging controller 19 (Step 100). The execution mode command invokes the debugging controller 19 to determines if the execution server 10 upon which the HTTP request is to be executed, is running (Step 101). If the execution server 10 is not running, the debugging controller sends a command to start the execution server 10 (Step 102). If the execution server 10 is running, then the debugging controller proceeds to determine if the execution server 10 is operating in the proper mode.

To determine if the execution server 10 is in the proper operating mode, the debugging controller 19 first determines what mode the execution server 10 has requested (Step 104). The debugging controller 19 determines the requested mode by checking which button 33 or 35 (in FIG. 2) is toggled. Next, the debugging controller 19 determines the current operating mode of the execution server 10 (Step 105). If the current execution mode and the requested mode are the same (Step 106), the debugging controller 19 forwards the HTTP request to the execution server 10 (step 108). If the current execution mode and the requested mode are not the same (Step 106), the debugging controller 19 switches to the requested mode (Step 107). The debugging controller 19 uses the server integration plugin to turn on or off the debugger (depending on which mode is required) using proprietary methods. Once this has been completed the IDE 6 forwards the HTTP request to the execution server (Step 108).

Figure 6:
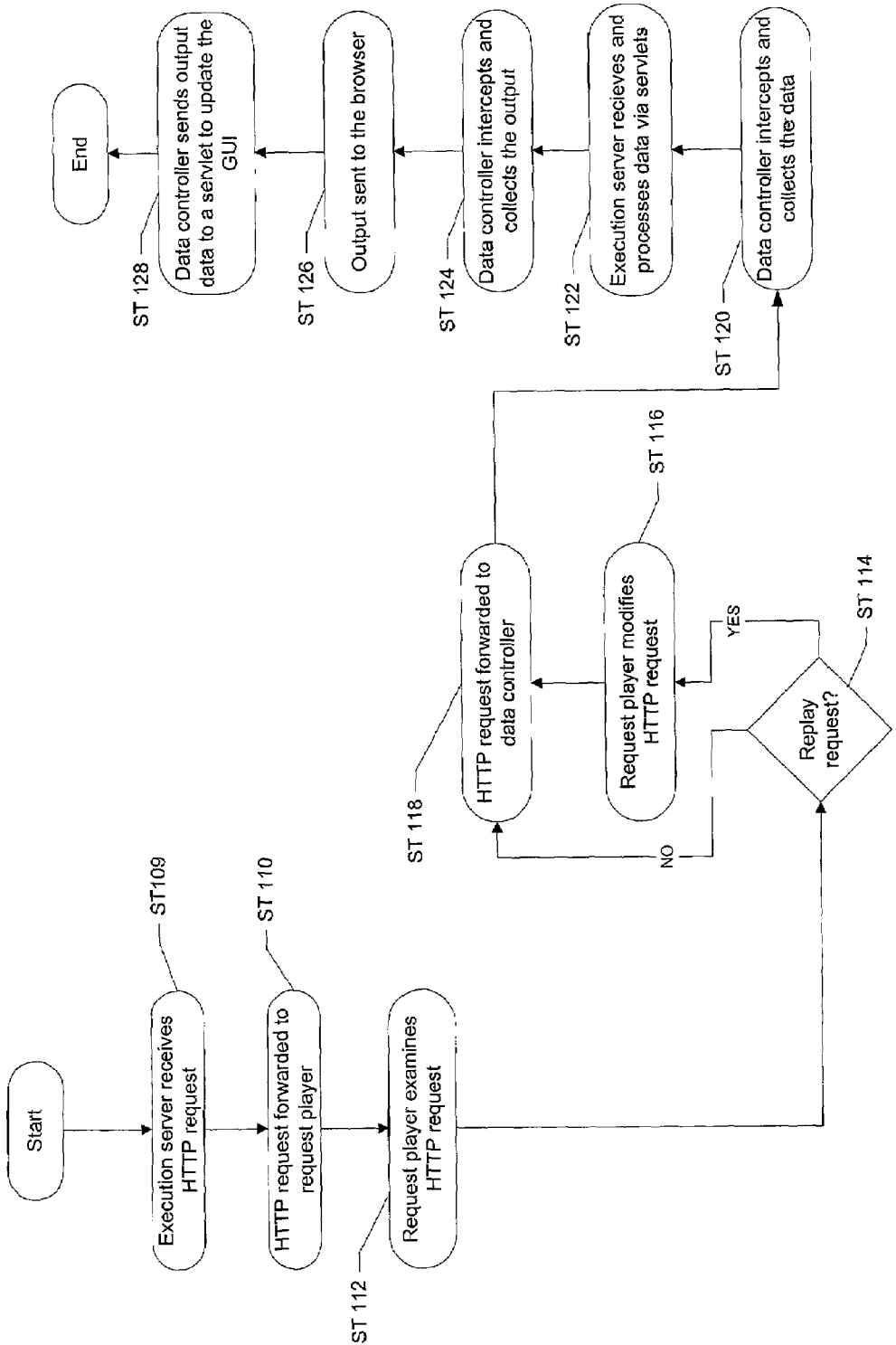
FIG. 6 illustrates, in flowchart form, the typical operation of the client-side component of one or more embodiments of the present invention.

FIG. 6 illustrates, in flowchart form, the typical operation of the server-side in one or more embodiments of the present invention. The execution server 10 receives the request (Step 109). The HTTP request is then sent to the request player 17 (Step 110). The request player 17 examines the HTTP request to see if it is a replay request (Step 112). If the HTTP request is a replay request (Step 114) the request player 17 modifies the request to include information about the transaction to be replayed (Step 116).

The HTTP request is then forwarded to the data collector 15 (Step 118). If it is not a replay request (Step 114), the request player 17 performs no action on the HTTP request, and the HTTP request is forwarded to the data collector 15 (Step 118). The data collector 15 then intercepts the HTTP request and collects data about it (Step 120). After collecting the data, control is returned to the execution server 10, and the execution server 10 processes the request. The execution server 10 invokes a servlet generated from the JSP™ page with the data that came in with the HTTP request (Step 122). After processing, the execution server 10 sends the response page back to the browser 52. Before the response page is sent to the browser 52, the data collector 15 again intercepts the response, collects data on the response (Step 124), and then forwards the output to the browser 52 (Step 126). After collecting data, the data collector 15 invokes the servlet 23 to update the GUI 22 (Step 128). As a result, as shown in FIG. 3, a "Get input.jsp" node has been added to "Current Transactions" subcategory on the left pane 26 of the GUI 22. The browser 48 displays the "request" data collected by the data collector 15 for the "Get input.jsp" transaction. It should be noted that the present invention may be used in conjunction with various replay options, such as "replay," "edit and replay," "sequence replay," etc.

Using the data collected by the data collector 15, the developer can examine the attributes of requests coming into the execution server 10 and responses sent out from the execution server 10 through the GUI 22. If a problem arises, the developer is able to find the source of the problem by examining the transactions between the browser 52 and the server 10. If a particular request for a resource or set of such requests is one that the developer wants to make regularly throughout the development phase, for instance, in order to verify that the web application continues to work as intended after the changes have been made, then the corresponding transaction records can be saved. This allows the developer to replay the corresponding HTTP requests during future IDE sessions. The developer can also use the save functionality in case they wish to defer fixing a problem to a later date. The transaction or transactions corresponding to the requests that reproduce the problem can be saved, giving the developer the opportunity to examine and replay them during a future IDE session.

To replay the request, the client-side component 16 issues a HTTP request to the execution server 10 through a browser 52. Prior to sending the request, the client-side component 16 invokes the debugging controller 19 which verifies that the execution server 10 to which the request is issued is running in the desired mode.

Advantages of the present invention may include one or more of the following. The debugging controller allows the user to transparently switch between normal server execution, and server execution within a debugging session. The present invention allows the debugging controller to be easily accessed from a GUI interface. The present invention allows the debugging controller to be used in conjunction with the various other replay options, such as "replay," "edit and replay," "sequence replay," etc. Those skilled in the art can appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for monitoring HTTP transactions between a server and a client, comprising:
    a data collector which runs on the server and collects data from HTTP requests sent by the client to the server and data from HTTP responses sent by the server to the client;
    a debugging controller which controls an execution mode of the server;
    a graphical display which displays the collected data and through which replay requests are sent to the server, each replay request specifying a prior HTTP request to be interpreted by the server; and
    a request player which runs on the server and modifies each replay request with a portion of the collected data associated with the prior HTTP request to be interpreted by the server.

2. The system of claim 1, wherein the execution mode is debugging.

3. The system of claim 2, further comprising:
    a debugger accessed by the server.

4. The system of claim 1, wherein the execution mode is normal.

5. The system of claim 1, wherein the debugging controller determines the execution mode using information gathered by a graphical user interface (GUI) and an integrated development environment (IDE).

6. The system of claim 1, wherein the request player modifies the replay requests prior to the server interpreting the replay requests.

7. The system of claim 6, wherein the request player comprises a process which uses a hook in the server to intercept the replay requests in order to modify the replay requests.

8. The system of claim 6, wherein the request player comprises a process which uses a hook in a server plug-in to intercept the replay requests in order to modify the replay requests.

9. The system of claim 1, wherein the collected data are stored in a directory on the server.

10. The system of claim 9, further comprising means for retrieving the collected data from the directory and serving the data to the request player and the graphical display.

11. The system of claim 1, further comprising means for re-processing a selected number of HTTP requests in a predetermined sequence.

12. The system of claim 1, wherein an application which provides the graphical display manages the collected data.

13. The system of claim 11, wherein the application is an integrated development environment for a web application.

14. The system of claim 1, wherein the debugging controller runs on the client.

15. The system of claim 1, further comprising means for notifying the graphical display when new data is collected by the data collector.

16. A system for testing and debugging a web application, comprising:
    a server which hosts the web application;
    a client which accesses components of the web application by sending HTTP requests to the server and receiving HTTP responses from the server;
    a data collector which runs on the server and collects data from the HTTP requests and the HTTP responses;
    a debugging controller which runs on the client and controls an execution mode of the server;
    a graphical display which displays the collected data and through which replay requests are sent to the server, each replay request specifying a prior HTTP request to be interpreted by the server; and
    a request player which runs on the server and modifies each replay request with a portion of the collected data associated with the prior HTTP request to be interpreted by the server.

17. The system of claim 16, wherein the execution mode is debugging.

18. The system of claim 17, further comprising:
    a debugger accessed by the server.

19. The system of claim 16, wherein the execution mode is normal.

20. The system of claim 16, wherein the debugging controller determines the execution mode using information gathered by a graphical user interface (GUI) and an integrated development environment (IDE).

21. The system of claim 16, further comprising:
an application which starts the server in a separate process and through which the graphical display can be accessed.

22. The system of claim 21, wherein the application is an integrated development environment for a web application.

23. The system of claim 22, wherein the client is accessible from within the integrated development environment.

24. The system of claim 21, wherein the application includes an internal server.

25. The system of claim 24, wherein the internal server updates the graphical display with the collected data.

* * * * *